US007313554B2

(12) United States Patent
Chen et al.

(10) Patent No.: US 7,313,554 B2
(45) Date of Patent: Dec. 25, 2007

(54) SYSTEM AND METHOD FOR INDEXING QUERIES, RULES AND SUBSCRIPTIONS

(75) Inventors: Shyh-Kwei Chen, Chappaqua, NY (US); Mark (Gee-Gwo) Mei, Yorktown Heights, NY (US); Kun-Lung Wu, Yorktown Heights, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/673,651

(22) Filed: Sep. 29, 2003

(65) Prior Publication Data
US 2005/0071322 A1    Mar. 31, 2005

(51) Int. Cl.
G06F 7/00 (2006.01)
G06F 17/30 (2006.01)

(52) U.S. Cl. .............................................. 707/3; 707/4
(58) Field of Classification Search ................ 707/3, 707/4, 2, 100
See application file for complete search history.

(56) References Cited

U.S. PATENT DOCUMENTS

| | | | |
|---|---|---|---|
| 5,664,172 A * | 9/1997 | Antoshenkov ................ 707/4 |
| 5,915,251 A | 6/1999 | Burrows et al. | |
| 5,940,833 A * | 8/1999 | Benson ..................... 707/100 |
| 6,105,019 A * | 8/2000 | Burrows ..................... 707/2 |
| 6,289,334 B1 * | 9/2001 | Reiner et al. ................ 707/3 |
| 6,439,783 B1 * | 8/2002 | Antoshenkov ................ 707/3 |
| 6,711,563 B1 * | 3/2004 | Koskas ..................... 707/3 |
| 7,010,522 B1 * | 3/2006 | Jagadish et al. ............... 707/3 |
| 2002/0069193 A1 * | 6/2002 | Beavin et al. ................ 707/2 |

OTHER PUBLICATIONS

Liu, Ling et al., "Continual Queries for Internet Scale Event-Driven Information Delivery,"1999, Published by Oregon Graduate Institute of Science and Technology, pp. 1-30.*
Liu, Ling, et al., "Continual Queries for Internet Scale Event-Driven Information Delivery," 1999, Published by Oregon Graduate Institute of Science and Technology, pp. 1-30.

* cited by examiner

*Primary Examiner*—Sam Rimell
*Assistant Examiner*—Giovanna B. Colan
(74) *Attorney, Agent, or Firm*—Gibb & Rahman, LLC; Rafael Perez-Pineiro, Esq.

(57) ABSTRACT

This invention introduces a new concept called virtual construct intervals (VCI), where each predicate interval is decomposed into one or more of these construct intervals. These VCIs strictly cover the predicate interval. Namely, every attribute value covered by the predicate interval is also covered by at least one of the decomposed VCIs, and vice versa. Each construct interval has a unique ID or interval coordinate and a set of endpoints. A construct interval is considered activated when a predicate interval using it in its decomposition is added to the system. The predicate ID is then inserted into the ID lists associated with the decomposed VCIs. To facilitate fast search, a bitmap vector is used to indicate the activation of VCIs that cover an event value. The challenge is to find an appropriate set of construct intervals to make predicate decomposition simple and, more importantly, to build efficient bitmap indexes. Because each construct interval covers only a small range of attribute values, the invention also uses bitmap clipping to cut unnecessary bitmap storage. To facilitate bitmap clipping, the invention introduce the covering segment concept. Bit positions outside a covering segment are pruned.

50 Claims, 9 Drawing Sheets

SYSTEM AND METHOD FOR INDEXING QUERIES, RULES AND SUBSCRIPTIONS

BACKGROUND OF THE INVENTION

1. Field of the Invention

The following discloses a method for indexing continual queries, rules, profiles and subscriptions, where the continual query, rule, profile or subscription can contain at least one interval predicate. Specifically, an interval predicate indexing method is disclosed for fast identification of queries, rules, profiles, and subscriptions that match a given event, condition, or publication.

2. Description of the Related Art

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

Content-based publication/subscription (pub/sub) systems, continual queries, profile-based applications, rule-based monitoring systems, and other information dissemination services in a large-scale distributed environment have become feasible and popular with the advent of the World Wide Web (WWW). Users of such systems and applications can easily set up or subscribe to services with a provider via the Web. These subscriptions, continual queries, profiles, and rules usually are expressed as predicates on a set of attributes. Each predicate involves an attribute, an operator and a value. A predicate represents the conditions, specifications or constraints expressed by the users. Predicates are used to filter out a large number of incoming events, conditions, or publications so that a user is notified only of those that meet his/her interests or specifications.

One of the most critical components of supporting large-scale continual queries, content-based pub/sub, or profile-based applications is the fast matching of events against the predicates. A large number of events can occur in a short period of time. Each event must be matched against a large number of predicates, perhaps in the hundreds of thousands or even millions. Hence, an efficient event matching system is needed. Usually, a main-memory based predicate index is required. This index must support dynamic insertions and deletions of predicates, as client interests/constraints are intermittently added into or removed from the system. The search complexity and the storage cost must be minimized. Furthermore, predicates may contain non-equality clauses, such as intervals. Unlike equality predicates, interval predicates are particularly difficult to index in the face of dynamic insertions and deletions.

An interval predicate index is used to efficiently answer the following question: "What are the predicate intervals in a set $Q=\{I_1, I_2, \ldots, I_n\}$ that cover a data point?" Here, $I_1, I_2, \ldots, I_n$ are predicate intervals, such as [4, 5], [2, 19], [24, 230] or [−, 8], that are specified by queries, rules, profiles or subscriptions. These predicate intervals represent the ranges of data values that users are interested in. The problem is to efficiently find all the queries or rules that a given data satisfy or match by maintaining an efficient interval index on the queries, rules or subscriptions. There are some systems in the area of interval indexing. However, they are mostly not effective for fast matching of events in a large-scale dynamic environment. Segment trees and interval trees (H. Samet, Design and Analysis of Spatial Data Structure, Addison-Wesley, 1990) generally work well in a static environment, but are not adequate when it is necessary to dynamically add or delete intervals. Originally designed to handle spatial objects, such as rectangles, R-trees (A. Guttman, "R-trees: A dynamic index structure for spatial searching," *Proceedings of the ACM SIGMOD*, 1984) can be used to index intervals. However, when there is heavy overlapping among the intervals, the search time can quickly degenerate. IBS-trees (E. Hanson, et al., "A predicate matching algorithm for database rule systems," *Proceedings of ACM SIGMOD*, 1990) and IS-lists (E. Hanson, et al., "Selection predicate indexing for active databases using interval skip lists," *Information Systems*, 21(3):269-298, 1996) were designed for interval indexing. As with most other dynamic search trees, the search time is $O(\log(n))$ and storage cost is $O(n \log(n))$, where n is the total number of predicate intervals. Moreover, in order to achieve the $O(\log(n))$ search time, a complex "adjustment" of the index structure is needed after an insertion or deletion. The adjustment is needed to re-balance the index structure. The adjustment of index increases the insertion/deletion time complexity. More importantly, the adjustment makes it difficult to reliably implement the algorithms in practice. Hence, a need is recognized for a new and more effective interval indexing method.

SUMMARY OF THE INVENTION

This invention introduces a new concept called virtual construct intervals (VCI), where each predicate interval is decomposed into one or more of these construct intervals. These VCIs strictly cover the predicate interval. Namely, every attribute value covered by the predicate interval is also covered by at least one of the decomposed VCIs, and vice versa. Each construct interval has a unique ID or interval coordinate and a set of endpoints. A construct interval is considered activated when a predicate interval using it in its decomposition is added to the system. The predicate ID is then inserted into the ID lists associated with the decomposed VCIs. To facilitate fast search, a bitmap vector is used to indicate the activation of VCIs that cover an event value. The challenge is to find an appropriate set of construct intervals to make predicate decomposition simple and, more importantly, to build efficient bitmap indexes. Because each construct interval covers only a small range of attribute values, the invention also uses bitmap clipping to cut unnecessary bitmap storage. To facilitate bitmap clipping, the invention introduces the covering segment concept. Bit positions outside a covering segment are pruned.

The invention supports efficient continual query/rule monitoring, making possible fast matching of a large number of queries, rules or subscriptions. The invention is efficient in both search time complexity and storage requirement for maintaining the query/rule index. The insertion and deletion are also very efficient. The search time complexity for finding all the predicate intervals that cover a data point is $O(1)$, independent of the number of predicate intervals maintained so far. The storage requirement is $O(n)$, which is proportional to the number of predicate intervals maintained so far. The insertion time is also $O(1)$.

A BRIEF DESCRIPTION OF THE DRAWINGS

DETAILED DESCRIPTION OF PREFERRED EMBODIMENTS OF THE INVENTION

This invention is related in general to efficient query/rule indexing, where each query or rule may involve one or more interval predicates. Specifically, an efficient interval predicate indexing scheme is disclosed. Such an interval predicate index is used to efficiently answer the following question: "What are the predicate intervals in a set $Q=\{I_1, I_2, \ldots I_n\}$ that cover a data point?" Here, $I_1, I_2, \ldots, I_n$ are predicate intervals such as [4, 5], (2, 19), (24, 230) or (–,*), that are specified by queries or rules. These predicate intervals represent the ranges of data values that users are interested in. The problem is to efficiently find all the queries or rules that a given data satisfy or match by maintaining an efficient index on the queries or rules. The invention supports efficient continual query/rule monitoring, making possible real-time monitoring of a large number of queries or rules. The invention is efficient in both search time complexity and storage requirement for maintaining the query/rule index. The search time complexity for finding all the predicate intervals that cover a data point is O(1), independent of the number of predicate intervals maintained so far. The storage requirement is O(n), which is proportional to the number of predicate intervals maintained so far.

Figure 1:
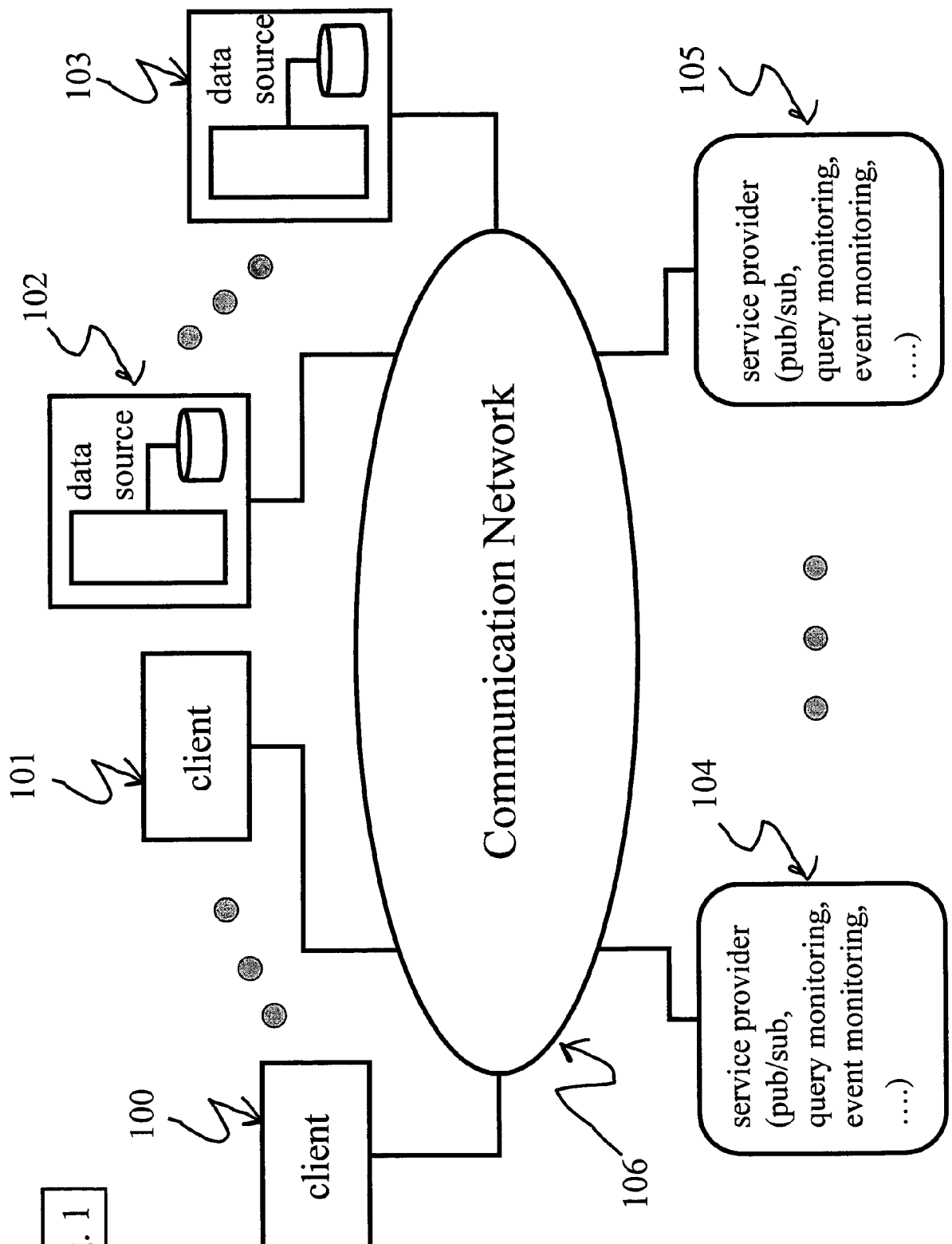
FIG. 1 is a block diagram of a distributed system environment where the current invention may be deployed.

FIG. 1 is a block diagram of a distributed system environment where various kinds of service providers 104, 105, data sources 102, 103, and clients 100, 101 are interconnected via a communication network 106. The communication network 106 can be the Internet or a wireless network. Various kinds of services, such as pub/sub, continual query monitoring, event monitoring, or rule monitoring, can be offered to clients on the network. The service providers employ the invention disclosed in the current preferred embodiment to monitor and manage data or events coming from one or more data sources 102, 103, in the distributed environment. The data sources can be temperature sensors, traffic sensors, data streams for stock prices, data streams for retail-store sales, and other. The clients 100, 101 can be any device that can receive signals, such as a personal computer, a cell phone, a traditional phone, or a personal digital assistant.

Figure 2:
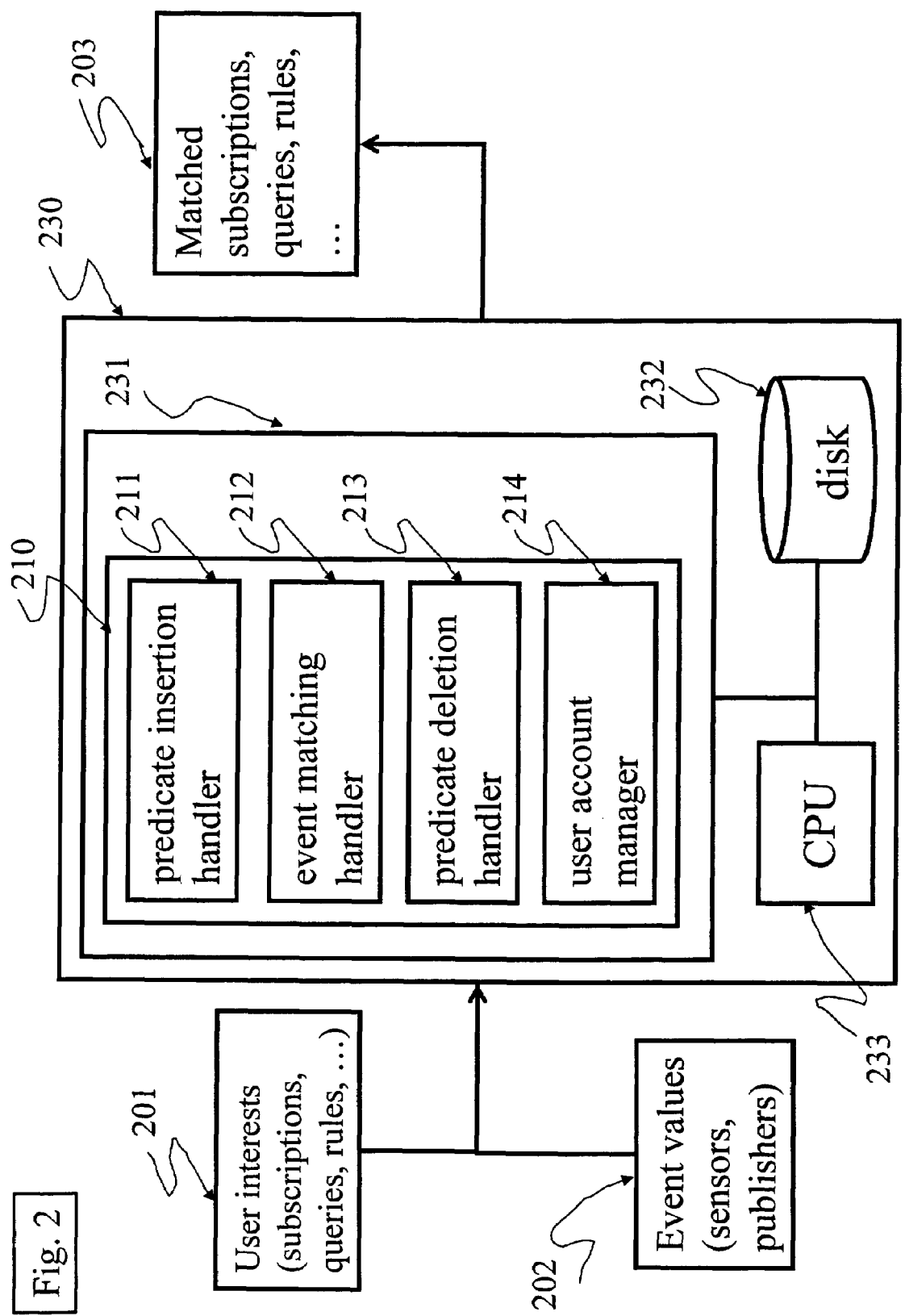
FIG. 2 is a block diagram of a system that implements the current invention.

FIG. 2 is a block diagram of a system that implements the invention disclosed in the current preferred embodiment. It is a computer system 230, which contains at least a CPU 233, a disk 232, and a main memory 230. Contained in the disk 232 and the main memory 231 are various software programs, one of which implements the logic of the invention. The program implementing the disclosed interval indexing method 210 contains at least a predicate insertion handler 211 (further described in FIG. 5), an event matching handler 212 (further described in FIG. 6), a predicate deletion handler 213 (further described in FIG. 7), and a user account manager 214. The user account manager 214 maintains the user subscriptions and other account management tasks. The main logic of the interval indexing method includes the predicate insertion handler 211, the predicate deletion handler 212 and the event matching handler 213, and they will be further described in more detail. The inputs to the system are user interests 201 and event values 202. The user interests are expressed in the forms of interval predicates in the subscriptions, continual queries, and rules. The event values are the readings from sensors or the contents of a publisher. The output 203 of the system is the matched subscriptions, queries or rules.

Figure 3:
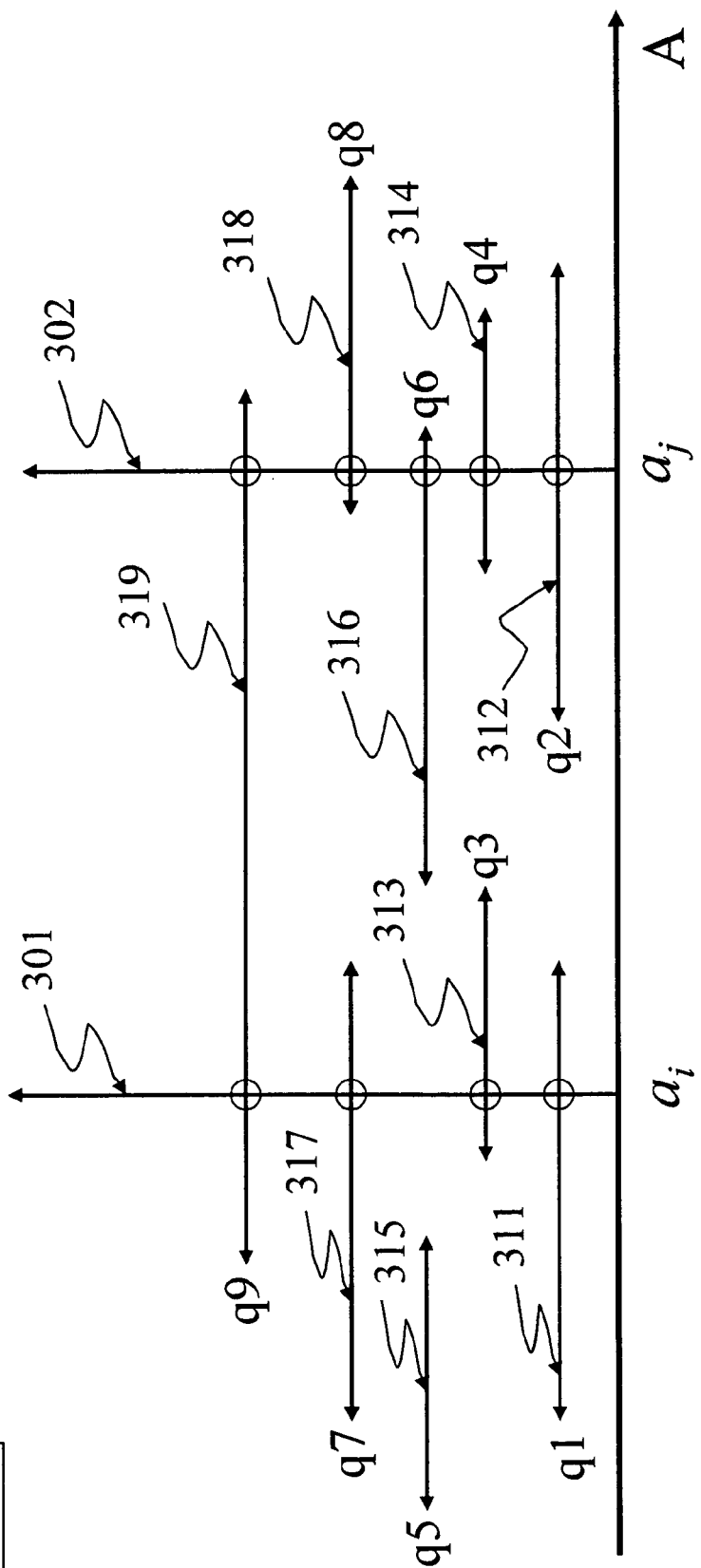
FIG. 3 is an example showing the problem of performing event matching in the presence of one or more interval predicates.

FIG. 3 is an example showing the problem of performing event matching in the presence of one or more interval predicates. Predicate intervals 311-319 are drawing horizontally from the left endpoint to the right endpoint. The event matching problem can be solved by drawing a vertical line at the event value. For example, two vertical lines 301, 302 are drawn at $a_i$ and $a_j$. The matched intervals are those that intersect with the vertical lines. For example, $\{q1,q3,q7,q9\}$ is the set of predicate intervals that match with $a_i$; $\{q2,q4,q6,q8,q9\}$ is the set of predicate intervals that match with $a_j$.

It is quite challenging to quickly identify those predicate intervals intersecting with the vertical line of an event value. Without the help of an interval index, one must perform the event matching via linear search. Namely, each event is compared with all predicate intervals. This can be an unacceptably slow process, especially when the number of predicate intervals is large.

The disclosed interval indexing method is an attempt to implement the idea shown in FIG. 3 in a cost-effective manner. For simplicity, it is assumed that the endpoints of a predicate interval are integers. However, the attribute can be of integer or non-integer data type. Those skilled in the art will appreciate that the invention can stretch the non-integer endpoints to the nearest integers. A set of virtual construct intervals, VCIs, are pre-defined at the integer values of an attribute. Each VCI has a unique ID, or coordinate, and specific endpoints. These VCIs are used to decompose a predicate interval. The decomposed VCIs strictly cover the predicate interval. Namely, any attribute value covered by the predicate interval is also covered by at least one of the decomposed VCIs, and vice versa.

For each integer value, the invention uses a bitmap vector to indicate the activation of certain VCIs that cover the value. Each bitmap vector contains a total of N=RL bits, where R is the total number of integer values for the attribute. Associated with each VCI, a predicate ID lists is maintained. The invention uses an array of header pointers to maintain such ID lists.

Figure 4:
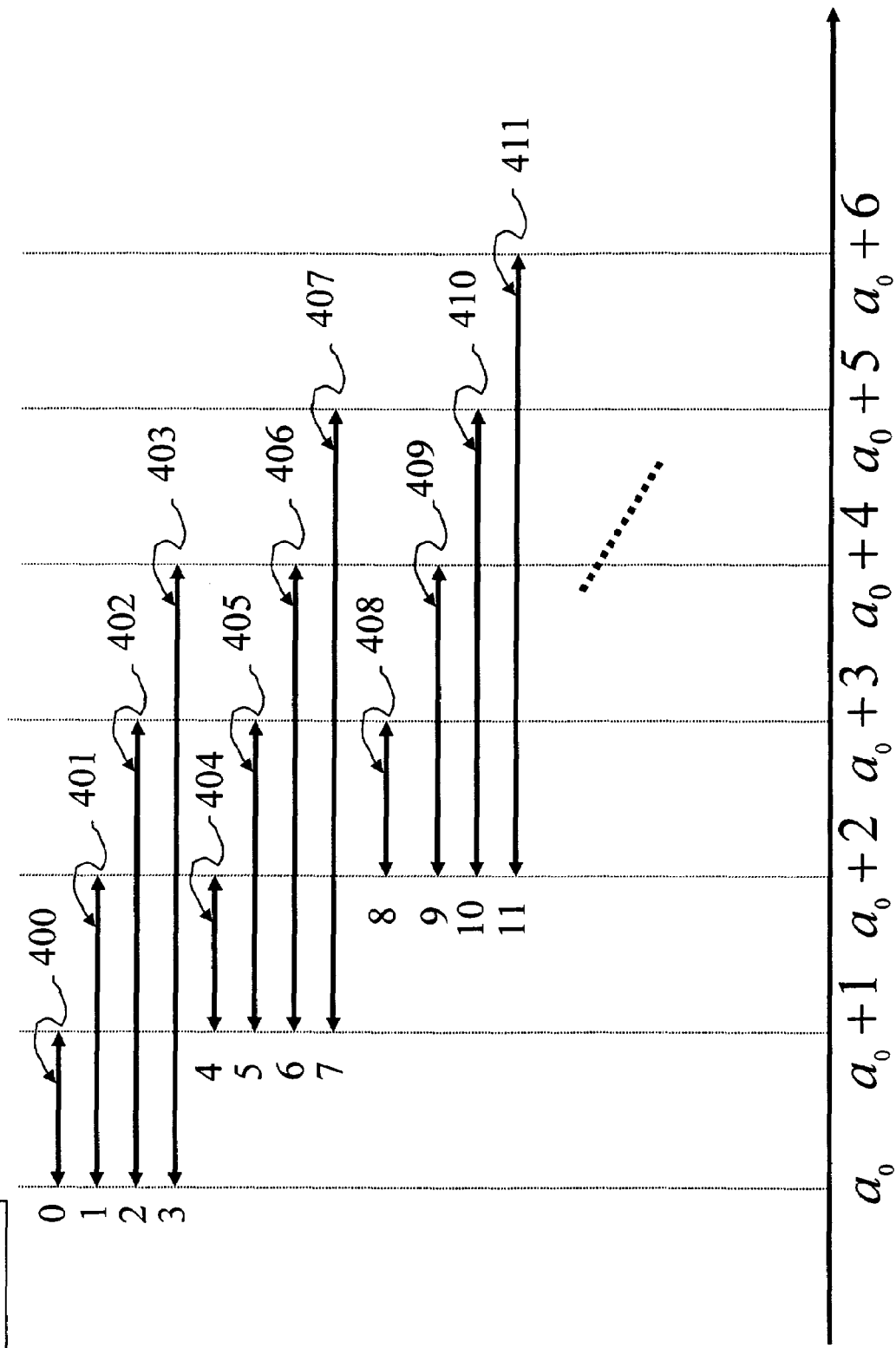
FIG. 4 is an example of a set of simple construct intervals (SCI).

FIG. 4 is an example of a set of simple construct intervals (SCI). Under SCI, L VCIs are pre-defined for each integer value. These VCIs have consecutive lengths ranging from 1 to L. The ID of a VCI c: [a, b], where c is the ID and [a, b] is the interval, can be computed as $c=(a-a_0)L+(b-a)-1$. In FIG. 4, L=4 and the ID starts from 0 for the interval [$a_0$, $a_0+1$]. There are four VCIs whose left endpoints are at the same integer value. For example, VCIs 0-3 (401-403) all start at $a_0$, but their right endpoints are different.

Figure 5:
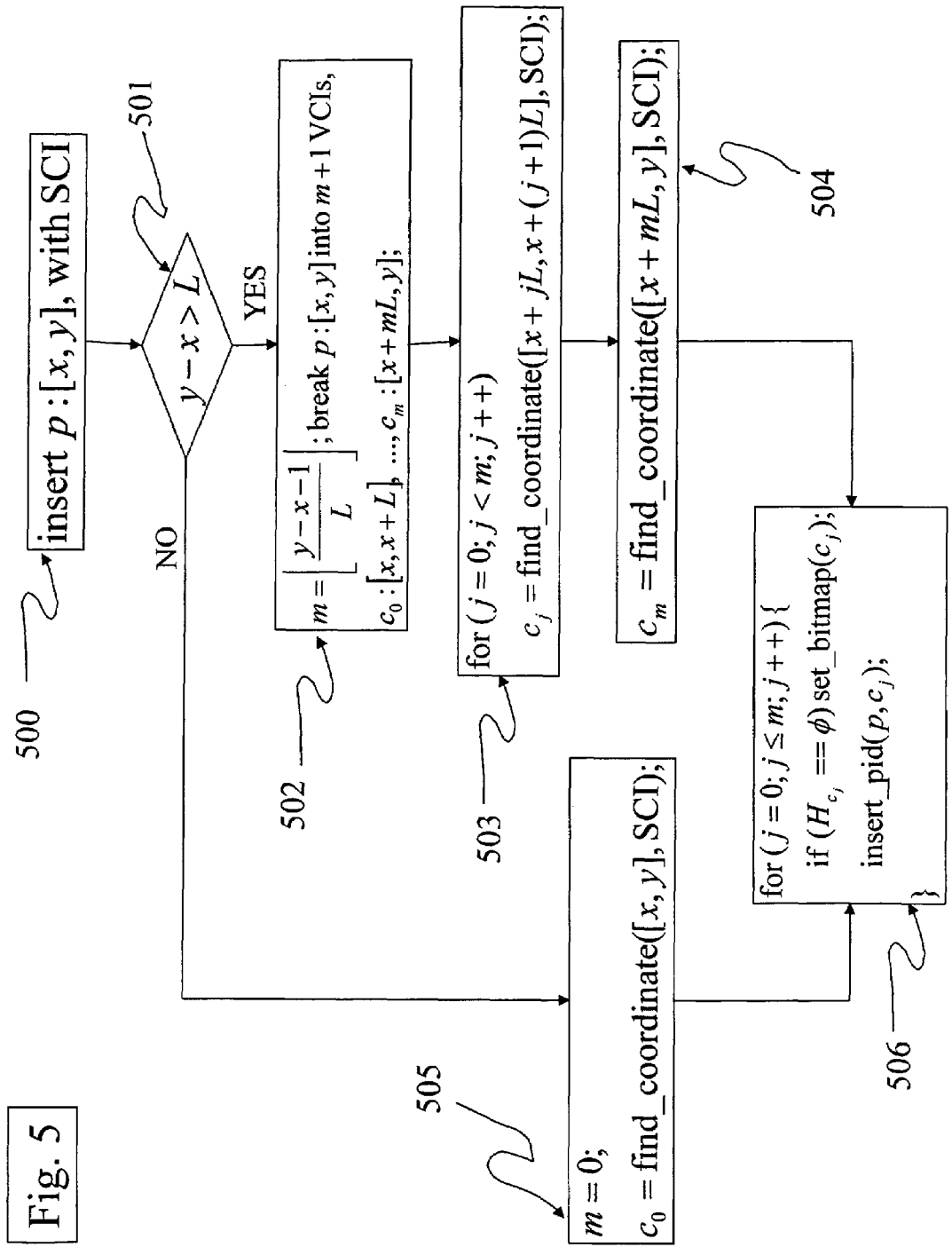
FIG. 5 is a flow chart diagram implementing the predicate insertion handler.

FIG. 5 is a flow chart diagram implementing the predicate insertion handler (211 in FIG. 2). To insert a predicate interval p: [x, y] (step 500), the invention first checks to see if the predicate interval is larger than the largest virtual construct interval y−x>L, 501. If not, then no decomposition is needed, and the invention simply finds the ID of the VCI that is the same as the predicate interval (step 505). If decomposition is needed, the invention repeatedly decomposes the predicate interval into $$m = \left\lfloor \frac{y - x - 1}{L} \right\rfloor$$

intervals of length L, starting from x (step 502). The last remnant is[x+mL,y]. After this decomposition, the ID of each decomposed VCI is computed (step 503 and step 504). Finally, for each decomposed VCI $c_j$, the invention sets the corresponding bitmap if $H_{c_j}$ is empty and insert the predicate ID to the corresponding ID list (step 506). Note that when setting bitmap for $c_j$, the invention needs to set bitmap $b_{i,c_j}$ to 1 for a≦i≦b, where $c_j$ is the ID of [a, b]. Here, $b_{i,c_j}$ means the bit position $c_j$ of bitmap vector $B_i$.

Figure 6:
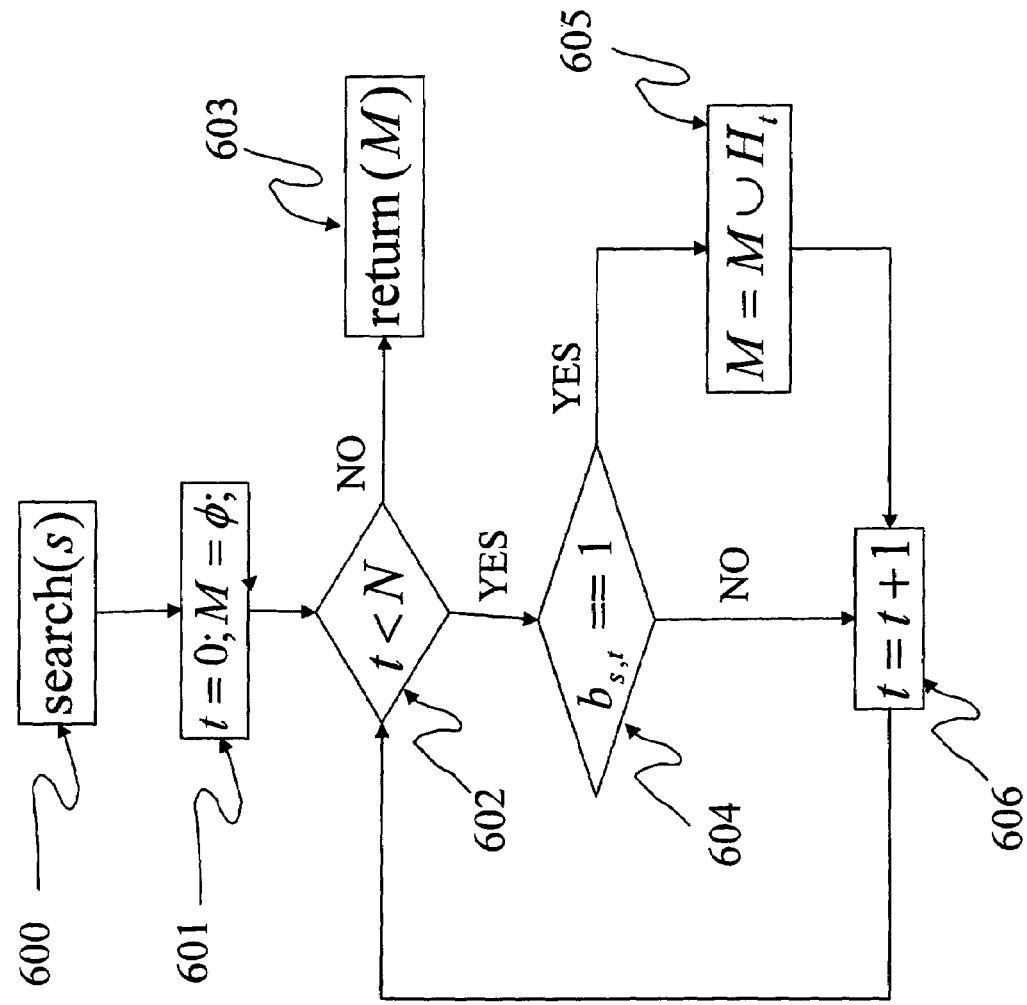
FIG. 6 is a flow chart diagram implementing the event matching handler.

FIG. 6 is a flow chart diagram implementing the event matching handler (212 in FIG. 2). The search begins with an event value s (step 600). The invention initializes the search result M to empty and t to 0 (step 601). The invention then tests to see if t<N, where N is the total number of VCIs (step 602). If not, the search ends and the result is returned (step 603). Otherwise, the invention further tests to see if $b_{s,t}=1$ (step 604). If yes, then the invention has a matched VCI and its associated ID lists would be combined with M (step 605). After that, the invention processes the next t (step 606) and proceeds to step 602.

Figure 7:
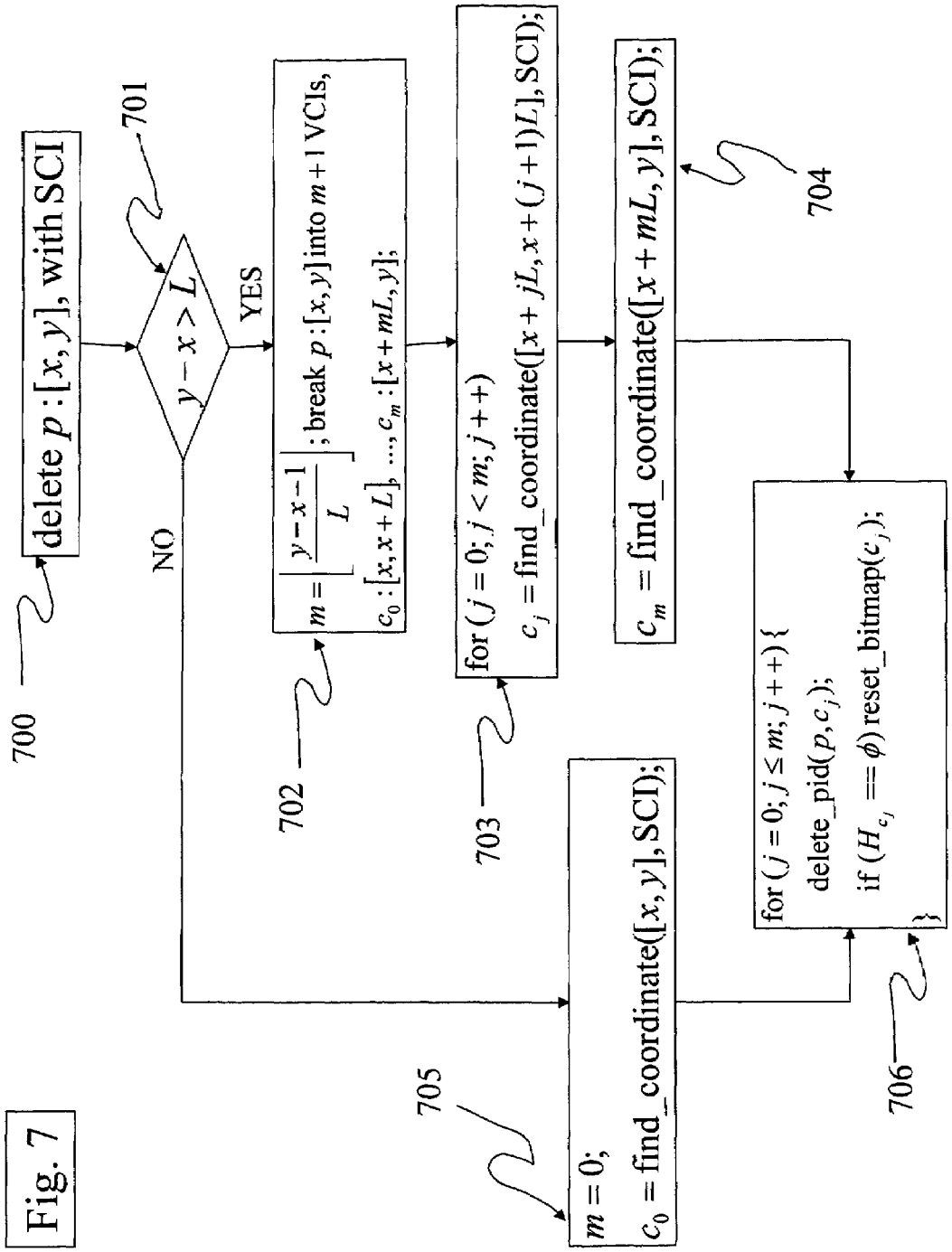
FIG. 7 is a flow chart diagram for the predicate deletion handler.

FIG. 7 is a flow chart diagram for the predicate deletion handler (213 in FIG. 2). It is almost the same as the insertion handler, except for step 706. Steps 701-705 are exactly the same as steps 501-505 in FIG. 5 because these steps represent the decomposition process. After decomposition, the invention proceeds to remove the predicate IDs from the ID lists and reset bitmap if the ID list becomes empty after the removal (step 706).

Figure 8:
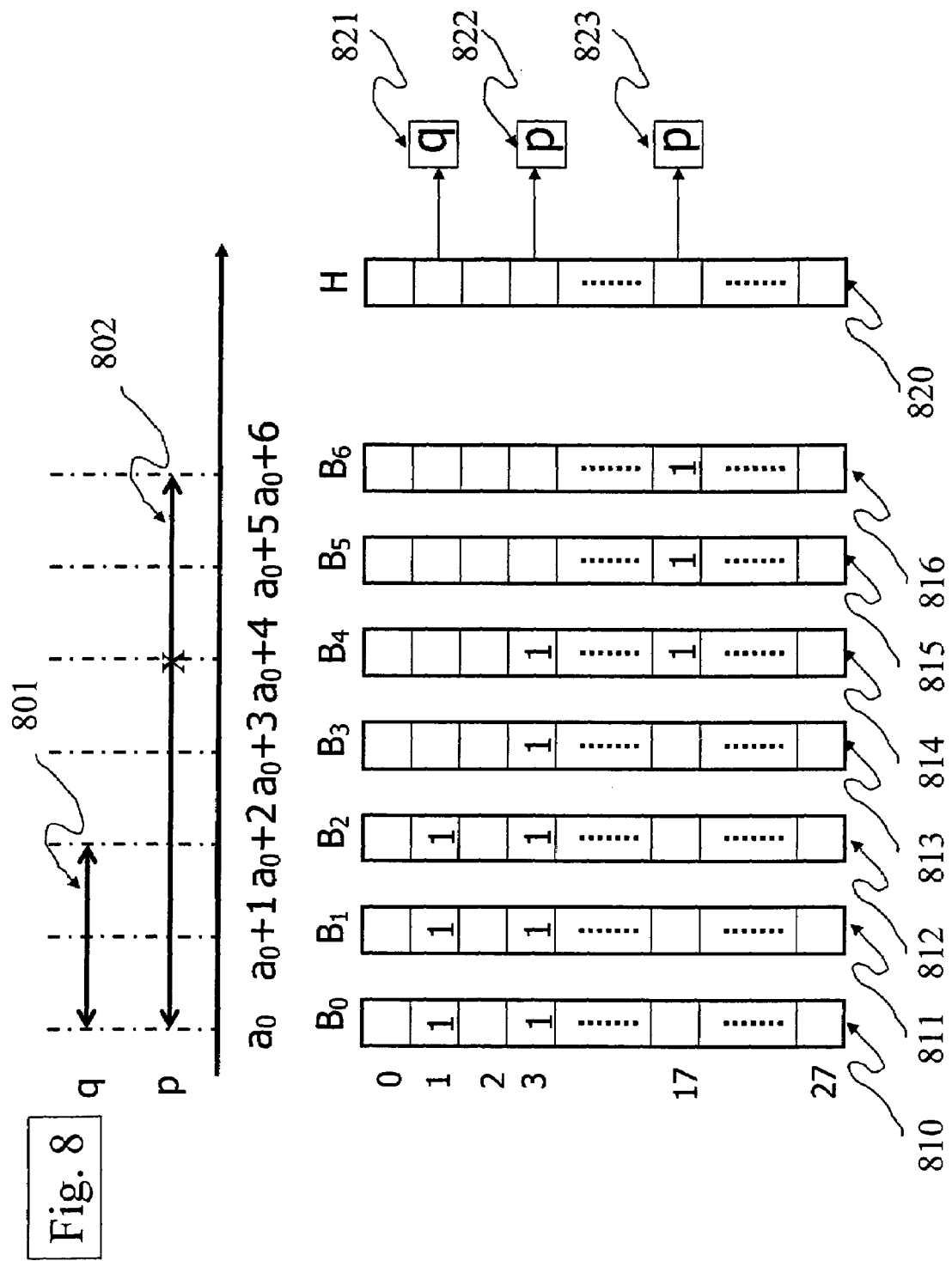
FIG. 8 is an example showing the VCI indexing using simple construct intervals.

FIG. 8 is an example showing the VCI indexing using simple construct intervals (SCIs). Two predicates q: [$a_0$, $a_0$+2] (801) and p: [$a_0$, $a_0$+6] (802) are inserted. The invention uses the example SCI shown in FIG. 4 for decomposition. Each bitmap vector has 28 bits and the invention show 7 bitmap vectors 810-816. An array of 28 pointer header (820) is used to manage the ID lists 821-823. Since L=4, no decomposition is needed for predicate q: [$a_0$, $a_0$+2]. Hence, the ID is inserted into $H_1$ (821) and $b_{0,1}$, $b_{1,1}$, $b_{2,1}$ are set to 1. On the other hand, p: [$a_0$, $a_0$+6] is first broken into [$a_0$, $a_0$+4] and [$a_0$+4, $a_0$+6].The ID of [$a_0$, $a_0$+4] is 3 and that of [$a_0$+4, $a_0$+6] is 17. Hence, its ID is inserted into the two ID lists 822-823. The corresponding bit positions are set to 1 as well.

Thus, the invention provides a method (and service/system) for maintaining and using a query index. As mentioned above, the queries within the query index have predicate intervals (e.g., 311-319 and 801-802). The invention begins by defining groups of virtual construct intervals (400-403, 404-407, 408-411, etc.) and inserting each of the predicate intervals 801-802 into at least one of the groups of the virtual construct intervals. More specifically, predicate interval 801 is inserted into virtual construct interval 401 of the first group (400-403) of virtual construct intervals shown in FIG. 4. Virtual construct interval 401 corresponds to bit positions $b_{0,1}$, $b_{1,1}$, $b_{2,1}$ of bitmap vectors 810-812 in FIG. 8. The invention only defines virtual construct intervals that are between the minimum and maximum possible attribute values of the predicate intervals.

Each of the groups of virtual construct intervals (e.g., 400-403) is adapted to hold multiple predicate intervals. Therefore, while virtual construct interval 401 maintains predicate interval 801, virtual construct interval 403 (which is in the same group of virtual construct intervals as a virtual construct interval 401) maintains predicate interval 802. Bit positions $b_{0,3}$, $b_{1,3}$, $b_{2,3}$, $b_{3,3}$, $b_{4,3}$ in bitmap vectors 810-814 (in FIG. 8) correspond to virtual construct interval 403 in FIG. 4. Thus, event values ($a_0$, $a_0$+1, $a_0$+2, etc.) of the predicate intervals (801, 802) are aligned with the same event values of the virtual construct intervals (401, 403) in that each bitmap vector 810-816 is associated exclusively with a single event value. It necessarily follows that predicate intervals are inserted only into the construct intervals that have corresponding event values. Thus, the same event value (e.g., $a_0$+1) of multiple predicate intervals (801, 802) are inserted into the same event value (e.g., $a_0$+1 in bitmap vector 811) within different virtual construct intervals (401, 403) and simply reside in different bit positions (1, 3) within the given bitmap vector (811). As mentioned previously, the locations of the predicate intervals within the groups of virtual construct intervals are maintained using the predicate ID bitmap vector 820.

Each of the groups of virtual construct intervals covers a unique group of event values. For example, the first group of virtual construct intervals (400-403) covers event values $a_0$ to $a_0$+4, while the second group of virtual construct intervals (404-407) covers event values $a_0$+1 to $a_0$+5. All virtual construct intervals in a group (400-403) began at the same attribute value ($a_0$) and end at different attribute values ($a_0$+1 to $a_0$+4). Note that the groups of virtual construct intervals have uniform lengths (FIG. 4), while the predicate intervals have non-uniform lengths (FIG. 3). In other words, all of the groups of the virtual construct intervals within the query index have the same pattern of different sized of virtual construct intervals; the first is one interval long, the second is two intervals long, the third is three intervals long, etc. within each of the groups.

If the predicate interval is small enough, the invention inserts the predicate interval into the same sized virtual construct interval, as shown by inserting the predicate interval 801 into virtual construct interval 401. However, if the predicate interval is larger than any of the virtual construct intervals, the invention first inserts an initial portion of the predicate interval into the largest available virtual construct interval. If necessary, a number of maximum-size virtual construct intervals can be utilized for excessively long predicate interval. The excess length of the predicate interval is referred to as the remnant predicate interval. The invention inserts the remnant predicate interval into the same length virtual construct interval. Thus, the last two event values of predicate interval 802 are placed into a similar length virtual construct interval (which would be virtual construct interval 417 if the repetitions in FIG. 4 are repeated).

Figure 9:
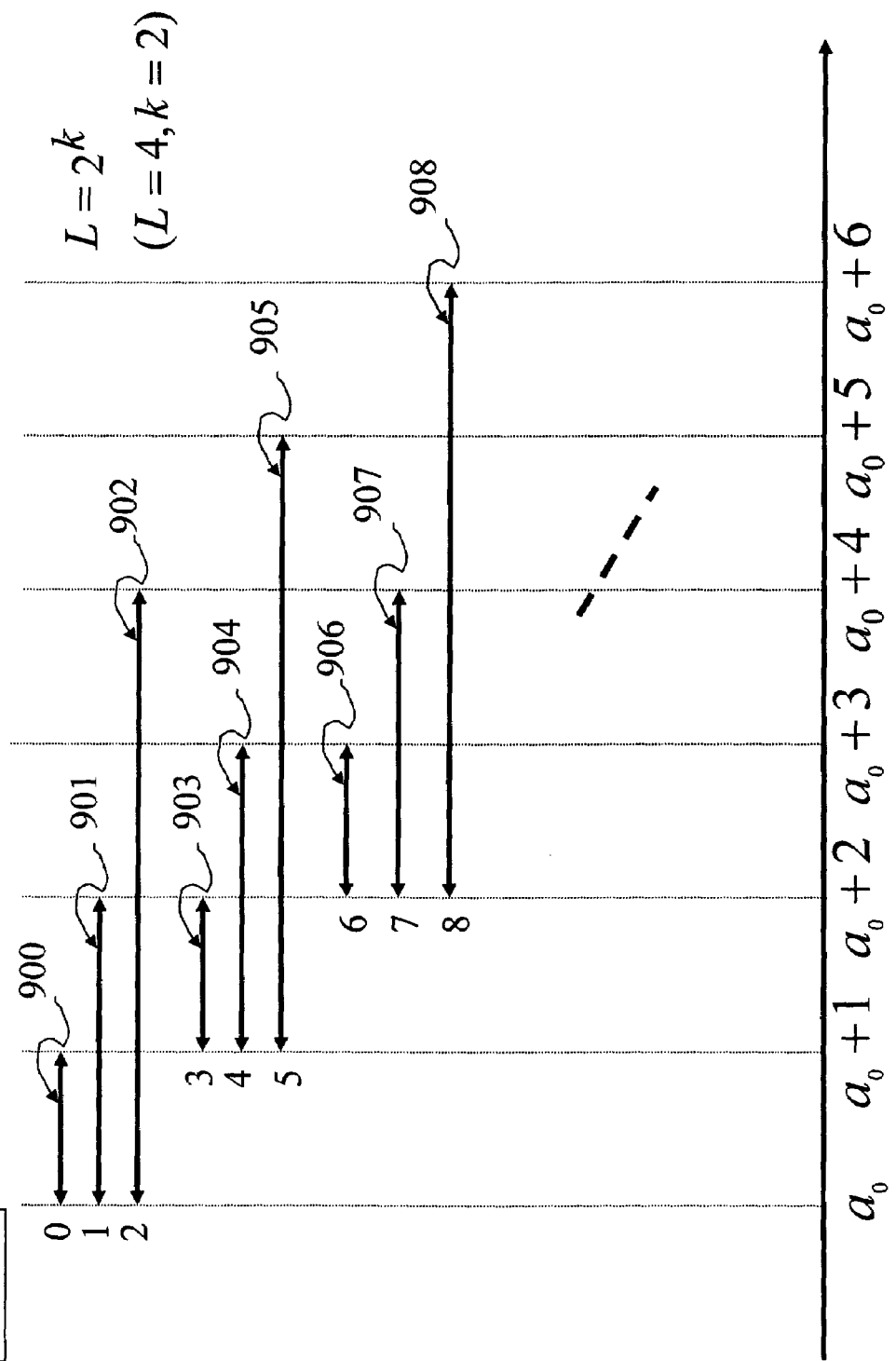
FIG. 9 shows an example of logarithmic construct intervals (LCI).

Different sets (groups) of VCI can be defined. FIG. 9 shows an example of logarithmic construct intervals (LCI). Instead of consecutive lengths, the invention uses $2^0$, $2^1$, ..., $2^k$ as the interval lengths. If L=4, the invention uses 1, 2, and 4 different VCI lengths for a set of pre-defined VCIs at an integer value. With logarithmic construct intervals, the total number of VCIs is R(log(L)+1), which is in general much less than that for the SCI.

Those skilled in the art will appreciate that some values in a bitmap vector will never be used. This is because some VCIs will never intersect with the vertical line of an event value. For example, [3 7] will never cover any event value less than 2 or greater than 8. Hence, the invention can prune certain bit positions from a bitmap vector. In fact, the invention can identify the minimum ID and the maximum ID for a bitmap vector $B_j$. For SCI, the minimum ID is (j−L)L+L−1 and the maximum ID is jL+L−1. Any bit position outside these two boundaries can be clipped, thus saving storage cost.

Those skilled in the art will also appreciate that user interests may be specified by more than one predicate clauses, some of which may be equality clauses while others non-equality. The interval index disclosed in the current invention can be used to index an attribute with both interval predicates and equality predicates. In this case, the invention treats equality as a virtual construct interval with length of zero. Moreover, separate interval indexes can be used for individual attributes for fast matching of event values for said individual attributes. The final result is derived by combining individual results from separate attributes.

Those skilled in the art will further appreciate that a predicate interval may be open-ended. In this case, the invention can treat the two open-ended intervals as two special VCIs, one is $[b^{max}, \infty)$, representing the right open-ended interval, and the other is $(-\infty, a^{min}]$, representing the left open-ended interval. Any event value less than $a^{min}$ will find all the predicate intervals with $-\infty$ as the left endpoint. Similarly, any event value that is greater than $b^{max}$ will find all the predicate intervals with $\infty$ as the right endpoint.

This invention introduces a new concept called virtual construct intervals, where each predicated interval is decomposed into a set of these construct intervals. Each construct interval has a unique ID or interval coordinated and a set of endpoints. A construct interval is considered activated when a predicate interval using it in its decomposition is added to the system. For each attribute value, a bitmap index is used to indicate the activation of any construct interval that covers the attribute value. The challenge is to find an appropriate set of construct intervals to make predicate decomposition simple and, more importantly, to build efficient bitmap indexes. Because each construct interval covers only a small range of attribute values, using the bitmap clipping to cut unnecessary bitmap storage. To facilitate bitmap clipping the introduction of the covering segment concept is used. Bit positions outside a covering segment are pruned.

While the invention has been described in terms of preferred embodiments, those skilled in the art will recognize that the invention can be practiced with modification within the spirit and scope of the appended claims.

The invention claimed is:

1. A method for maintaining and using a query index to support continual query monitoring, said method comprising:
    defining groups of virtual construct intervals, wherein said virtual construct intervals represent predetermined ranges of data values and correspond to specific bit positions in bit map vectors;
    determining predicate intervals, wherein said predicate intervals represent specified ranges of data values from continual queries; and
    inserting each of said predicate intervals into said bit map positions of at least one of said groups of said virtual construct intervals such that said specified ranges of data values of said predicate intervals are aligned with said predetermined ranges of said data values of said virtual construct intervals.

2. The method in claim 1, wherein each of said groups of virtual construct intervals is adapted to hold multiple predicate intervals, and
    wherein said groups of virtual construct intervals have uniform lengths, and
    wherein said predicate intervals have non-uniform lengths.

3. The method in claim 1, further comprising maintaining locations of said predicate intervals within said groups of virtual construct intervals using a predicate ID bitmap vector.

4. The method in claim 1, wherein said process of defining said groups of virtual construct intervals comprises beginning all virtual construct intervals in a group of virtual construct intervals at a same data value and ending said virtual construct intervals in said group of virtual construct intervals at different data values.

5. The method in claim 1, wherein said process of inserting said predicate intervals into said virtual construct intervals, comprises inserting said predicate interval into the same sized virtual construct interval.

6. The method in claim 1, wherein when a predicate interval is larger than any of said virtual construct intervals, said inserting process comprises:
    inserting an initial portion of said predicate interval into the largest available virtual construct interval, wherein a length in excess of a length of said initial portion of said predicate interval comprises a remnant predicate interval; and
    inserting the remnant predicate interval into the same length virtual construct interval.

7. The method in claim 1, wherein said inserting further comprises inserting said predicate intervals such that each of said virtual construct intervals holds multiple predicate intervals, wherein all of said groups of said virtual construct intervals within said query index have the same pattern of different sized virtual construct intervals.

8. A method for maintaining and using a query index to support continual query monitoring, said method comprising:
    defining groups of virtual construct intervals, wherein said virtual construct intervals represent predetermined ranges of data values and correspond to specific bit positions in bit map vectors;
    determining predicate intervals, wherein said predicate intervals represent specified ranges of data values from continual queries; and
    inserting each of said predicate intervals into said bit map positions of at least one of said groups of said virtual construct intervals such that said specified ranges of data values of said predicate intervals are aligned with said predetermined ranges of said data values of said virtual construct intervals,
    wherein each of said groups of virtual construct intervals is adapted to hold multiple predicate intervals,
    wherein all of said groups of said virtual construct intervals within said query index have the same pattern of different sized virtual construct intervals,
    wherein said groups of virtual construct intervals have uniform lengths, and
    wherein said predicate intervals have non-uniform lengths.

9. The method in claim 8, further comprising maintaining locations of said predicate intervals within said groups of virtual construct intervals using a predicate ID bitmap vector.

10. The method in claim 8, wherein said process of defining said groups of virtual construct intervals comprises beginning all virtual construct intervals in a group of virtual construct intervals at a same data value and ending said virtual construct intervals in said group of virtual construct intervals at different data values.

11. The method in claim 8, wherein said process of inserting said predicate intervals into said virtual construct intervals, comprises inserting said predicate interval into the same sized virtual construct interval.

12. The method in claim 8, wherein when a predicate interval is larger than any of said virtual construct intervals, said inserting process comprises:
   inserting an initial portion of said predicate interval into the largest available virtual construct interval, wherein a length in excess of a length of said initial portion of said predicate interval comprises a remnant predicate interval; and
   inserting the remnant predicate interval into the same length virtual construct interval.

13. The method of claim 8, wherein said defining process only defines virtual construct intervals that are between the minimum and maximum possible data values of said predicate intervals.

14. A method for maintaining and using a query index to support continual query monitoring, said method comprising:
   defining groups of virtual construct intervals, wherein said virtual construct intervals represent predetermined ranges of data values and correspond to specific bit positions in bit map vectors;
   determining predicate intervals, wherein said predicate intervals represent specified ranges of data values from continual queries; and
   inserting each of said predicate intervals into said bit map positions of at least one of said groups of said virtual construct intervals such that said specified ranges of data values of said predicate intervals are aligned with said predetermined ranges of said data values of said virtual construct intervals,
   wherein all of said groups of said virtual construct intervals within said query index have the same pattern of different sized of virtual construct intervals, and
   wherein each of said groups of said virtual construct intervals is adapted to hold multiple predicate intervals.

15. The method in claim 14, further comprising maintaining locations of said predicate intervals within said groups of virtual construct intervals using a predicate ID bitmap vector.

16. The method in claim 14, wherein said process of defining said groups of virtual construct intervals comprises beginning all virtual construct intervals in a group of virtual construct intervals at a same data value and ending said virtual construct intervals in said group of virtual construct intervals at different data values.

17. The method in claim 14, wherein said process of inserting said predicate intervals into said virtual construct intervals, comprises inserting said predicate interval into the same sized virtual construct interval.

18. The method in claim 14, wherein when a predicate interval is larger than any of said virtual construct intervals, said inserting process comprises:
   inserting an initial portion of said predicate interval into the largest available virtual construct interval, wherein a length in excess of a length of said initial portion of said predicate interval comprises a remnant predicate interval; and
   inserting the remnant predicate interval into the same length virtual construct interval.

19. The method in claim 14, wherein said groups of virtual construct intervals have uniform lengths, wherein said predicate intervals have non-uniform lengths and wherein said defining process only defines virtual construct intervals that are between the minimum and maximum possible data values of said predicate intervals.

20. A method for maintaining and using a query index to support continual query monitoring, said method comprising:
   defining groups of virtual construct intervals, wherein said virtual construct intervals represent predetermined ranges of data values and correspond to specific bit positions in bit map vectors;
   determining predicate intervals, wherein said predicate intervals represent specified ranges of data values from continual queries; and
   inserting each of said predicate intervals into said bit map positions of at least one of said groups of said virtual construct intervals such that said specified ranges of data values of said predicate intervals are aligned with said predetermined ranges of said data values of said virtual construct intervals,
   wherein each of said groups of virtual construct intervals is adapted to hold multiple predicate intervals, and
   wherein said defining process only defines virtual construct intervals that are between the minimum and maximum possible data values of said predicate intervals.

21. The method in claim 20, further comprising maintaining locations of said predicate intervals within said groups of virtual construct intervals using a predicate ID bitmap vector.

22. The method in claim 20, wherein said process of defining said groups of virtual construct intervals comprises beginning all virtual construct intervals in a group of virtual construct intervals at a same data value and ending said virtual construct intervals in said group of virtual construct intervals at different data values.

23. The method in claim 20, wherein said process of inserting said predicate intervals into said virtual construct intervals, comprises inserting said predicate interval into the same sized virtual construct interval.

24. The method in claim 20, wherein when a predicate interval is larger than any of said virtual construct intervals, said inserting process comprises:
   inserting an initial portion of said predicate interval into the largest available virtual construct interval, wherein a length in excess of a length of said initial portion of said predicate interval comprises a remnant predicate interval; and
   inserting the remnant predicate interval into the same length virtual construct interval.

25. The method in claim 20, wherein said groups of virtual construct intervals have uniform lengths, wherein said predicate intervals have non-uniform lengths and wherein all of said groups of said virtual construct intervals within said query index have the same pattern of different sized virtual construct intervals.

26. A service adapted to maintains and use a query index to support continual query monitoring, said service:

defining groups of virtual construct intervals, wherein said virtual construct intervals represent predetermined ranges of data values and correspond to specific bit positions in bit map vectors;

determining predicate intervals, wherein said predicate intervals represent specified ranges of data values from continual queries; and inserting each of said predicate intervals into said bit map positions of at least one of said groups of said virtual construct intervals such that said specified ranges of data values of said predicate intervals are aligned with said predetermined ranges of said data values of said virtual construct intervals.

27. The service in claim 26, further comprising maintaining locations of said predicate intervals within said groups of virtual construct intervals using a predicate ID bitmap vector.

28. The service in claim 26, wherein said process of defining said groups of virtual construct intervals comprises beginning all virtual construct intervals in a group of virtual construct intervals at the same attribute value and ending said virtual construct intervals in said group of virtual construct intervals at different attribute values.

29. The service in claim 26, wherein said process of inserting said predicate intervals into said virtual construct intervals, comprises inserting said predicate interval into the same sized virtual construct interval.

30. The service in claim 26, wherein if when a predicate interval is larger than any of said virtual construct intervals, said inserting process comprises:

inserting an initial portion of said predicate interval into the largest available virtual construct interval, wherein a length in excess of a length of said initial portion of said predicate interval comprises a remnant predicate interval; and inserting the remnant predicate interval into the same length virtual construct interval.

31. The service in claim 26, wherein said groups of virtual construct intervals have uniform lengths, wherein said predicate intervals have non-uniform lengths and wherein said defining process only defines virtual construct intervals that are between the minimum and maximum possible data values of said predicate intervals.

32. A system for maintaining and using a query index to support continual query monitoring, said system comprising:

a plurality of bitmap vectors which define groups of virtual construct intervals wherein said virtual construct intervals represent predetermined ranges of data values and correspond to specific bit positions in said bit map vectors;

a predicate insertion handler adapted to insert predicate intervals into said bit map positions of at least one of said groups of said virtual construct intervals wherein said predicate intervals represent specified ranges of data values from continual, wherein said predicate intervals are inserted such that said specified ranges of data values of said predicate intervals are aligned with said predetermined ranges of said data values of said virtual construct intervals.

33. The system in claim 32, further comprising a predicate ID bitmap vector adapted to maintain locations of said predicate intervals within said groups of virtual construct intervals.

34. The system in claim 32, wherein all of said groups of said virtual construct intervals have the same pattern of different sized of virtual construct intervals.

35. The system in claim 32, wherein said predicate insertion handler inserts said predicate intervals into the same sized virtual construct intervals.

36. The system in claim 32, wherein when a predicate interval is larger than any of said virtual construct intervals, said predicate insertion handler:

inserts an initial portion of said predicate interval into the largest available virtual construct interval, wherein a length in excess of a length of said initial portion of said predicate interval comprises a remnant predicate interval; and inserts the remnant predicate interval into the same length virtual construct interval.

37. The system in claim 32, wherein said groups of virtual construct intervals have uniform lengths, wherein said predicate intervals have non-uniform lengths and wherein said defining process only defines virtual construct intervals that are between the minimum and maximum possible data values of said predicate intervals.

38. A program storage device readable by machine, tangibly embodying a program of instructions executable by the machine to perform a method for maintaining and using a query index to support continual query monitoring, said method comprising:

defining groups of virtual construct intervals, wherein said virtual construct intervals represent predetermined ranges of data values and correspond to specific bit positions in bit map vectors;

determining predicate intervals, wherein said predicate intervals represent specified ranges of data values from continual queries; and inserting each of said predicate intervals into said bit map positions of at least one of said groups of said virtual construct intervals such that said ranges of data values of said predicate intervals are aligned with said predetermined ranges of said data values of said virtual construct intervals.

39. The program storage device in claim 38, wherein said method further comprises maintaining locations of said predicate intervals within said groups of virtual construct intervals using a predicate ID bitmap vector.

40. The program storage device in claim 38, wherein said process of defining said groups of virtual construct intervals comprises beginning all virtual construct intervals in a group of virtual construct intervals at a same data value and ending said virtual construct intervals in said group of virtual construct intervals at different data values.

41. The program storage device in claim 38, wherein all of said groups of said virtual construct intervals within said query index have the same pattern of different sized of virtual construct intervals.

42. The program storage device in claim 38, wherein when a predicate interval is larger than any of said virtual construct intervals, said inserting process comprises:

inserting an initial portion of said predicate interval into the largest available virtual construct interval, wherein a length in excess of a length of said initial portion of said predicate interval comprises a remnant predicate interval; and inserting the remnant predicate interval into the same length virtual construct interval.

43. The program storage device in claim 38, wherein said inserting further comprises inserting said predicate intervals such that each of said virtual construct intervals holds multiple predicate intervals, wherein said groups of virtual construct intervals have uniform lengths, wherein said predicate intervals have non-uniform lengths and wherein all of said groups of said virtual construct intervals within said query index have the same pattern of different sized virtual construct intervals.

44. The method of claim 1, wherein said predetermined range intervals of at least some of said virtual construct intervals between and within said groups of construct intervals overlap.

45. The method of claim 8, wherein said predetermined range intervals of at least some of said virtual construct intervals between and within said groups of construct intervals overlap.

46. The method of claim 14, wherein said predetermined range intervals of at least some of said virtual construct intervals between and within said groups of construct intervals overlap.

47. The method of claim 20, wherein said predetermined range intervals of at least some of said virtual construct intervals between and within said groups of construct intervals overlap.

48. The service of claim 26, wherein said predetermined range intervals of at least some of said virtual construct intervals between and within said groups of construct intervals overlap.

49. The system of claim 32, wherein said predetermined range intervals of at least some of said virtual construct intervals between and within said groups of construct intervals overlap.

50. The program storage device of claim 38, wherein said predetermined range intervals of at least some of said virtual construct intervals between and within said groups of construct intervals overlap.

* * * * *